United States Patent Office 3,378,886
Patented Apr. 23, 1968

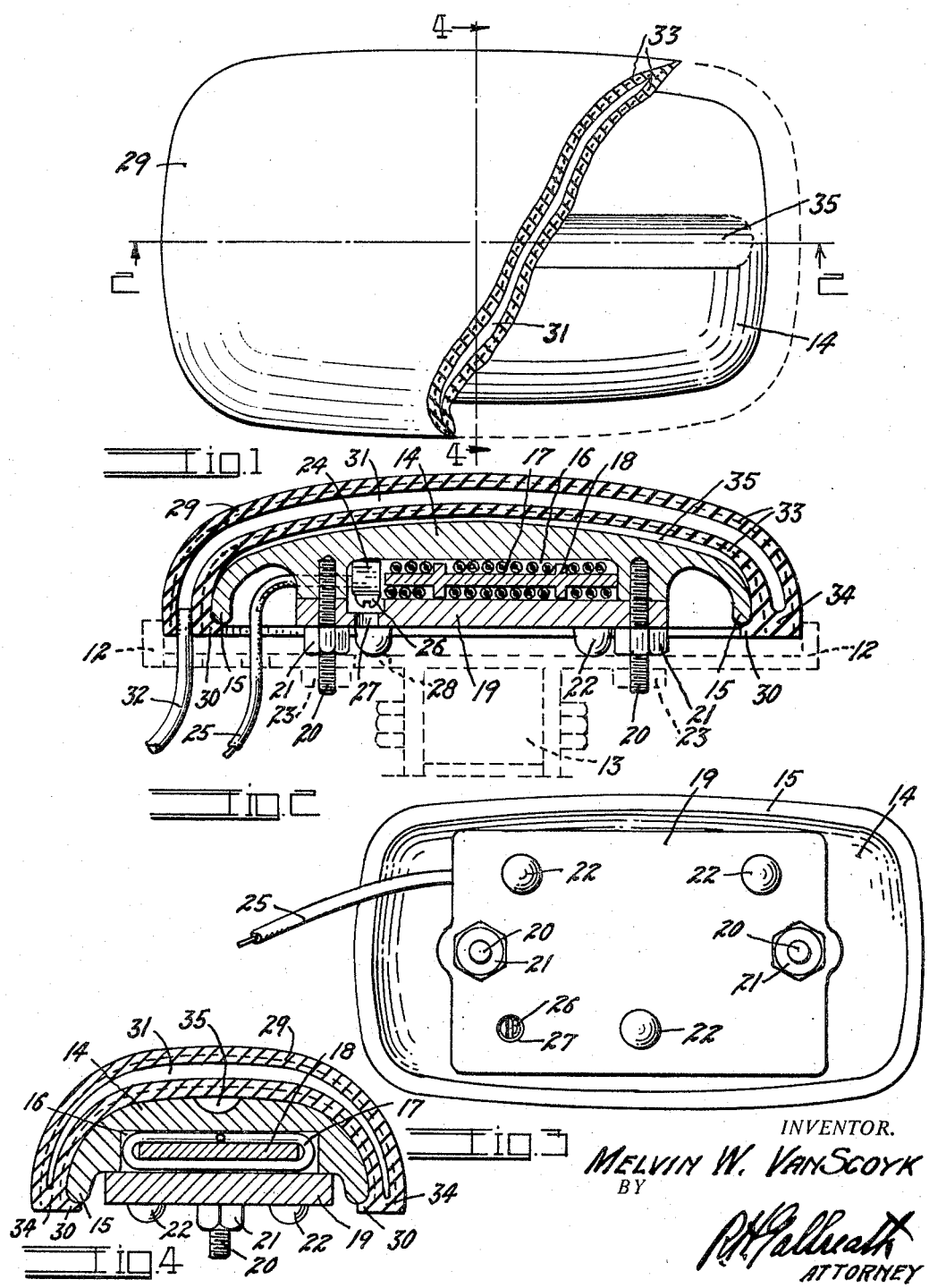

3,378,886
AIR BAG ELEMENTS FOR TIRE CASING SPOTTERS
Melvin W. Van Scoyk, 5655 Marshal St.,
Arvada, Colo. 80002
Filed June 16, 1966, Ser. No. 558,005
6 Claims. (Cl. 18—18)

The invention relates in general to a tire casing "spotter," that is, a device for making repairs at various "spots" on a vehicle tire casing such as illustrated and described in applicant's prior Patent No. 2,814,073. Such devices vulcanize or cure the repaired spot by clamping the repair between an air bag element, positioned on the inside of the casing, and an electrically-heated mandrel or tread plate, positioned on the outside of the casing. Such devices have not been completely satisfactory due to the fact that the heat is applied only on the exterior of the tire and must be convected through the varying heavy treads to the raw rubber of the repair. Thus, the proper curing temperature of the repair and the time necessary for a perfect cure is exceedingly difficult to accurately control and results in under or over curing of the repaired "spot."

This invention relates more particularly to the air bag element of such a device and has for its principal object the provision of an air bag for inside placement in the casing which will be internally heated, themostatically controlled, and pneumatically maintained in close proximity to the repair so that accurate curing control can be uniformly attained.

A further object is to provide an air bag in which the air may freely flow throughout the interior of the bag even though the latter be mechanically compressed in a tire casing spotter so that the bag will be uniformly expanded against the interior of the casing and the repair therein.

A still further object is to provide an air bag: which will be replaceable with the present non-heated air bag elements; which will be economical to manufacture; which will not interfere with the construction and operation of present spotters; and which will uniformly produce satisfactory results.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a top plan view of the bag element of this invention partially broken away to show internal structure;

FIG. 2 is a longitudinal section therethrough taken on the line 2—2, FIG. 1;

FIG. 3 is a bottom view looking upwardly illustrating a body shell employed in the air bag element of this invention; and FIG. 4 is a cross section of the complete element taken on the line 4—4, FIG. 1.

The air bag element of this invention is designed to replace the conventional air bags which are presently mounted upon the air bag plates of tire casing spotters and which are illustrated and described in applicant's prior Patent No. 2,814,073. The position of a conventional air bag plate, upon which the air bag element of this invention is designed to be mounted, is shown in broken line at 12 in FIG. 2 with its mounting at 13. The present invention replaces the conventional air bag usually found upon the plate 12.

The air bag element of this invention employs an elongated, unitary body shell 14, preferably cast from aluminum, or other metal of high thermal conductivity. The top of the body shell is both transversely rounded, as shown in FIG. 4, to approximate the curvature of the transverse inner surface of a pneumatic vehicle tire and longitudinally rounded, as shown in FIG. 2, to closely approximate the annular circumference of the inner surface of the tread portion of the tire. The body shell presents an elongated figure having four arcuately curved and downwardly turned sides. The four sides terminate in rounded lower edges 15 positioned in a common plane.

A substantially rectangular heater cavity 16 is medially indented upwardly in the bottom of the body shell 14 to a position closely adjacent the upper surface of the shell. A relatively flat heating element 17, preferably consisting of asbestos-insulated resistance wire (such as Nichrome) wound about a flat nonferrous core piece 18 is maintained in the cavity 16 by means of a cover plate 19. The cover plate is removably clamped in place by means of studs 20 threaded into the body shell and provided with suitable clamp nuts 21. The cover plate 19 is provided with downwardly extending supporting bosses 22 which support the bag element in spaced relation to any suitable supporting surface on the spotter assembly such as to the air bag plate 12. The studs 20 project downwardly through the nuts 21 and provide means for locking the improved bag element to the conventional air bag plate 12 through medium of mounting nuts 23.

A thermostat switch 24 of any conventional type is mounted in the cavity 16 with the heating element 17 and is connected in series with the latter and a two-conductor supply cord 25 for thermally controlling the current supply to the element. The thermostat switch 24 is of a type having a presetting adjustment 26 which can be actuated by a screw driver blade inserted upwardly through a tool opening 27 in the cover plate 19 and, if necessary, through a similar tool opening 28 in the air bag plate 12 of the spotter.

The body shell is completely covered by means of an inverted-cup-shaped, double-walled air bag 29 having a bottom contour to fit snugly over, against, and around the body shell and having an internal base bead 30 which snaps under the rounded peripheral edge 15 of the body shell to tightly maintain the bag in place thereon.

The air bag 29 has an upper, outer wall and a lower inner wall separated by an air chamber 31 to which compressed air may be supplied by means of a suitable air hose 32. The walls are reinforced by layers of cord, as indicated at 33.

The air bag may be formed by placing two similar pieces of properly shaped, uncured, cord stock together and pressing them between male and female dies in a heated vulcanizing press to produce the desired elongated cup shape with their peripheral edges unitarily vulcanized together, as indicated at 34, and with their medial surfaces free of each other to form the air chamber 31.

In use, the air bag assembly is placed on the bag plate 12 of a conventional spotter. The repaired casing is placed thereover and the repaired spot is clamped against the air bag 29 by means of a pressure screw clamp with which conventional spotters are provided. The thermostat switch 24 is preset by means of the presetting adjustment 26 to control and maintain the desired curing temperature at the repaired spot.

When the screw clamp is tightened the two air bag walls will be urged tightly together over the repaired spot. Compressed air is now admitted through the hose 32 to cause the upper outer wall to expand outwardly to conform to the inside contours of the casing being repaired so as to form a smooth continuous surface against the repaired spot. Thermostatically-controlled current is now supplied to the heating element 17 to maintain the air bag and the air therein at a preset temperature until the cure is completed. The temperature can be adjusted by means of a screw driver inserted through the openings 22 and 27 into engagement with the presetting adjustment 26.

It has been found that occasionally the two walls of the air bag 29 will be so tightly mechanically pressed together that air will be prevented from flowing the full length of the chamber 31 and uniform expansion will be interfered with. To avoid this, a shallow, medially-positioned groove 35 is indented in the upper surface of the body shell 14 for substantially its full length. This groove relieves the mechanical pressure against the lower inner wall along its longitudinal medial portion so that the air, when it is initially admitted, can flow the full length of the bag so as to uniformly distribute the pneumatic pressure over the entire area of the outer wall of the bag to obtain smooth, uniform contact with the inner wall of the tire or casing.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. An air bag element for tire casing spotters comprising:
   (a) an inverted-cup-shaped, metallic body shell having a heater cavity indented upwardly in its bottom;
   (b) an electrical heating element positioned in said cavity;
   (c) a cover plate closing the bottom of said cavity and concealing said heating element;
   (d) an inverted-cup-shaped, flexible, inflatable, air bag extending over the top and sides of said body shell; and
   (e) means for pneumatically inflating said air bag.

2. An air bag element for tire casing spotters as described in claim 1 having:
   (a) a thermostatically-actuated control switch encased in said cavity in circuit with said heating element and acting to maintain said element at a uniform maximum temperature.

3. An air bag element for tire casing spotters as described in claim 2 having:
   (a) a presetting adjustment device on said control switch which is accessible through an opening in said cover plate for manual adjustment of the thermostatically controlled temperature.

4. An air bag element for tire casing spotters as described in claim 1 in which the airbag comprises:
   (a) a lower flexible wall shaped to fit over, against and around said body shell; and
   (b) an upper flexible wall shaped to fit over and around said lower flexible wall, said walls being vulcanized together around their peripheries, the medial portions of said walls being unattached to form an air chamber between said walls.

5. An air bag element for tire casing spotters as described in claim 4 having an internal base head projecting inwardly from the vulcanized-together peripheries and extending inwardly beneath the periphery of said body shell to retain said air bag in place thereon.

6. An air bag element for tire casing spotters as described in claim 5 having a longitudinally-extending indented groove in the top of said body shell for relieving the mechanical pressure between said body shell and said lower wall over a portion of the area of the latter wall.

References Cited

UNITED STATES PATENTS

| | | |
|---|---|---|
| 1,718,485 | 6/1929 | O'Sullivan. |
| 2,814,073 | 11/1957 | Van Scoyk. |
| 2,837,767 | 6/1958 | Mac Donald. |
| 2,991,505 | 7/1961 | Van Scoyk. |
| 3,172,158 | 3/1965 | Herman et al. |

J. HOWARD FLINT, JR., *Primary Examiner.*